United States Patent [19]

Neyret

[11] Patent Number: 4,561,116

[45] Date of Patent: Dec. 24, 1985

[54] OPTICAL REMOTE-CONTROL DEVICE FOR A RESIDENCE DOOR

[75] Inventor: Guy Neyret, Oullins, France

[73] Assignee: Neiman S.A., Courbevoie, France

[21] Appl. No.: 568,203

[22] PCT Filed: Mar. 22, 1983

[86] PCT No.: PCT/EP83/00082

§ 371 Date: Nov. 22, 1983

§ 102(e) Date: Nov. 22, 1983

[87] PCT Pub. No.: WO83/03442

PCT Pub. Date: Oct. 13, 1983

[30] Foreign Application Priority Data

Mar. 24, 1982 [FR] France ................ 82 05141

[51] Int. Cl.[4] ................ H04B 9/00

[52] U.S. Cl. ................ 455/603; 49/171; 70/262; 220/82 A; 350/171

[58] Field of Search ................ 455/603; 70/262, 263, 70/266, 271, DIG. 51; 49/171; 220/82 R, 82 A; 350/319, , 171, 172; 358/100, 108

[56] References Cited

U.S. PATENT DOCUMENTS

| | | | |
|---|---|---|---|
| 2,968,790 | 1/1961 | Carbonara | 340/164 |
| 3,944,336 | 3/1976 | Carr, Jr. | 350/174 |
| 3,973,835 | 8/1976 | Miyakawa | 350/319 |
| 4,196,347 | 4/1980 | Hadley | 455/603 |
| 4,412,356 | 10/1983 | Klaus et al. | 455/603 |

FOREIGN PATENT DOCUMENTS

| | | | |
|---|---|---|---|
| 3102874 | 8/1982 | Fed. Rep. of Germany | 455/603 |
| 1574813 | 9/1980 | United Kingdom | 49/171 |

OTHER PUBLICATIONS

"Siemens Aims IR-Beam"-Electronics-May 26, 1977, pp. 5E-6E.

*Primary Examiner*—Joseph A. Orsino, Jr.

*Attorney, Agent, or Firm*—Karl F. Ross; Herbert Dubno

[57] ABSTRACT

The device consists of an inspection glass (3) inserted in the door (1), a semi-transparent mirror (5) which is arranged inclined behind the inspection glass (3) and which faces the inspection glass (3) with the semi-reflecting side (6), and an optical receiver (7) which is located in the axis of reflection of the mirror (5).

The invention is used in the building industry.

3 Claims, 1 Drawing Figure

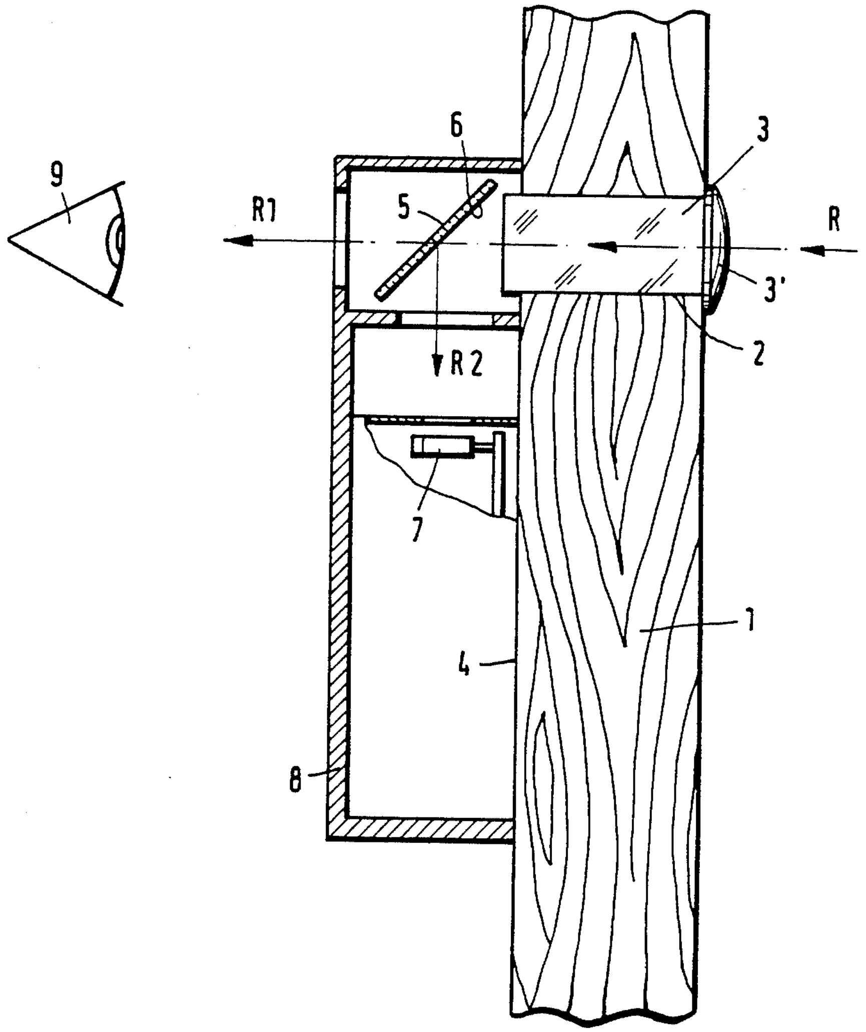
9
R1
6
5
R2
7
8
4
3
R
3'
2
1

OPTICAL REMOTE-CONTROL DEVICE FOR A RESIDENCE DOOR

CROSS REFERENCE TO RELATED APPLICATIONS

My present application is a National Phase Application based upon the International Application No. PCT/EP83/00082 filed Mar. 22, 1983 and based, in turn, upon a French National Application No. 82/05141 of Mar. 24, 1982 under the International Convention.

FIELD OF THE INVENTION

The invention relates to an optical remote-control device for a residence door.

BACKGROUND OF THE INVENTION

Remote-control devices are already known which consist of a portable transmitter and a receiver connected to the object to be controlled. Control can be carried out by means of infrared rays, the transmitter emitting a signal which has to be received by the receiver so as to trigger a function, for example unlocking.

In the case of a residence door, the receiver is accessible from outside and is therefore vulnerable. Moreover, an orifice for accommodating the receiver has to be provided in the door.

OBJECT OF THE INVENTION

The object of the invention is to eliminate these disadvantages of known devices.

SUMMARY OF THE INVENTION

According to the invention, this object is achieved by means of a device which consists of an inspection glass in the door, a semi-transparent mirror which is arranged behind the inspection glass in an inclined position and the semi-reflecting side of which faces the inspection glass, and an optical receiver which is located on the axis of reflection of the mirror.

Consequently, in the device according to the invention, the receiver is invisible and inaccessible from outside. Furthermore, apart from the inspection hole, no orifice in the door is required.

BRIEF DESCRIPTION OF THE DRAWING

The invention is explained in greater detail with reference to the drawing.

The sole FIGURE is a sectional view of part of a door which is equipped with a device according to an embodiment of the invention.

SPECIFIC DESCRIPTION

The door 1 has a bore 2 in which an inspection glass 3 is inserted in a known way. Arranged on the inside 4 of the door 1 is a semi-transparent mirror 5 which is inclined at an angle of 45° and the semi-reflecting surface 6 of which faces the rear side of the inspection glass 3. An optical receiver 7 is located in the axis of reflection of the mirror 5. The mirror 5, receiver 7 and the control device (not shown) are enclosed in a housing 8 which is attached to the rear side 4 of the door 1.

On the inside, the observer's eye 9 receives some $R_1$ of the light beams R which come from outside and which pass through the inspection glass 3 and mirror 5. In this way, he can see normally, in a known way, a visitor who is outside. The visitor notices only the outer part 3' of the inspection glass 3.

When an optical transmitter (not shown) located behind the door exactly in the axis of the inspection glass 3 is actuated, the beam R emitted, for example an infrared beam, is partially reflected from the surface 6 of the mirror 5 as a beam $R_2$ and arrives at the receiver 7. The information transmitted by the beam R, for example a code, is received by the receiver 7 which can transfer it to the control device.

In another embodiment (not shown), the inspection glass consists of two lenses, appropriately one on each side of the door. In this case, it is advantageous to arrange the mirror between the two lenses and to arrange the receiver in the wall of the inspection hole. The device is then completely enclosed inside the door. The space required for the inspection hole is hardly increased at all as a result.

I claim:

1. An optical remote-control device for a residence door, which comprises an inspection glass in the door, a semi-transparent mirror which is arranged inclined behind the inspection glass and having a semi-reflecting side facing the inspection glass, and an optical receiver for generating a remote control signal which is located in the axis of reflection of the mirror.

2. A device as claimed in claim 1 wherein the mirror and the receiver are enclosed in a housing which is attached to a rear side of the door.

3. A device as claimed in claim 1 wherein the inspection hole contains two lenses, the mirror is arranged between the two lenses, and the receiver is arranged in the wall of the inspection hole.

* * * * *